US012645312B1

(12) United States Patent
     Liu et al.

(10) Patent No.:     US 12,645,312 B1
(45) Date of Patent:          Jun. 2, 2026

(54) MOUSE SCROLL WHEEL MECHANISM

(71) Applicant: TOPRAY MEMS INC., Hsinchu City (TW)

(72) Inventors: Chin-Sung Liu, Hsinchu City (TW); Chi-Ling Chang, Hsinchu City (TW); Hsiao-Ming Chien, Hsinchu City (TW)

(73) Assignee: TOPRAY MEMS INC., Hsinchu (TW)

( * ) Notice:    Subject to any disclaimer, the term of this patent is extended or adjusted under 35 U.S.C. 154(b) by 0 days.

(21) Appl. No.: 19/230,116

(22) Filed:    Jun. 6, 2025

(30)          Foreign Application Priority Data

Mar. 31, 2025    (TW) .................................. 114112454

(51) Int. Cl.
     *G06F 3/038*          (2013.01)
     *G06F 3/0362*        (2013.01)
     *G06F 3/0354*        (2013.01)
(52) U.S. Cl.
     CPC ............ *G06F 3/038* (2013.01); *G06F 3/0362* (2013.01); *G06F 3/03543* (2013.01)
(58) Field of Classification Search
     CPC .... G06F 3/038; G06F 3/0362; G06F 3/03543; G06F 3/033; G06F 3/0354
     See application file for complete search history.

(56)                 References Cited

U.S. PATENT DOCUMENTS

2002/0158844 A1 *  10/2002   McLoone ............. G06F 3/0312
                                                                345/163
2020/0004346 A1 *   1/2020   Vlasov .................. H01F 7/0226
2021/0165507 A1 *   6/2021   Chiu ................... G06F 3/03543

FOREIGN PATENT DOCUMENTS

WO       WO-2025165364 A1 *   8/2025   ......... G06F 3/03543

* cited by examiner

*Primary Examiner* — Patrick N Edouard
*Assistant Examiner* — Joseph P Fox

(57)                 ABSTRACT

A mouse scroll wheel mechanism includes a wheel base and a wheel body, wherein the wheel base is provided with an axial hole, and a plurality of bearings are arranged at different positions in the axial hole; a rotating shaft extending outward is arranged at the center of the wheel body in a plurality of the bearings, so that the wheel body can rotate outside the wheel base, and the rotating shaft can also move in the bearing in an axial direction over a short distance so that the wheel body can move to a first position and a second position; a mechanical pressure traction structure is provided between the wheel body and the wheel base, the first position is a flywheel mode wherein the wheel body can rotate freely, and the second position is a toggle mode wherein the wheel body rotates intermittently.

10 Claims, 7 Drawing Sheets

MOUSE SCROLL WHEEL MECHANISM

CROSS-REFERENCE TO RELATED APPLICATION

This application claims the priority of Taiwanese patent application No. 114112454, filed on Mar. 31, 2025, which is incorporated herewith by reference.

BACKGROUND OF THE INVENTION

1. Field of the Invention

The present invention relates generally to the technical field of computer mouse, and more particularly, to a mouse scroll wheel mechanism.

2. The Prior Arts

A mouse is a device commonly used to control the cursor on the screen and perform corresponding operations with the computer. In addition to the basic left and right buttons for input, some mice also have auxiliary control wheels. Turning the wheel allows quick browsing of web pages or as an auxiliary operation of the cursor. In order to increase the accuracy of the wheel rotation, this type of mouse has a mechanical spring inside the mouse to produce resistance to the wheel, so that the wheel produces an intermittent gear feel when it rotates, which is the toggle mode. In addition, some users want to browse the web quickly, so a release mechanism is added to the mouse to provide such operation mode. When the mouse is released, the scroll wheel can be quickly rotated, such as rotating a large angle at one time or rotating more than one circle, which is called the flywheel mode. However, the above release mechanism usually installs an electric control component and a mechanical linkage structure inside the mouse to drive the mechanical spring to leave the original locking position, thereby achieving the purpose of switching between different operation modes. Therefore, during the operation, the finger must first move to the trigger button and after the trigger, the finger must return to the scroll wheel to continue in a different operation mode. The design is not very convenient for the operator, so the present invention seeks to design a mechanism to address this issue.

SUMMARY OF THE INVENTION

A primary objective of the present invention is to provide a mouse scroll wheel mechanism, and more particularly, to provide a scroll wheel mechanism that can be pushed axially to switch between a toggle mode and a flywheel mode, thereby allowing an operator to switch between the two modes while the operator's finger is in contact with the scroll wheel.

To achieve the aforementioned objective, the present invention adopts the following technical solution:

The present invention is a mouse scroll wheel mechanism, comprising: a wheel base and a wheel body, the wheel base is provided with an axial hole, and a plurality of bearings are arranged at different positions in the axial hole; a rotating shaft extending outward is arranged at the center of the wheel body, and the rotating shaft is arranged in a plurality of the bearings, so that the wheel body can rotate on the outside the wheel base, and the rotating shaft can also move a short distance in the axial direction in the bearing, so that the wheel body moves to a first position and a second position, the wheel body is provided with an annular member on an inner wall facing the wheel base, and an end face of the annular member protruding outward is an annular wavy surface; the wheel base has a second side wall facing the wheel body, and a movable elastic top member is provided on the second side wall; when the wheel body is in the first position, the elastic top member is not in contact with the annular wavy surface, and the wheel body can rotate freely when moved; when the wheel body is in the second position, the elastic top member contacts the annular wavy surface, and moving the wheel body will produce a gear feel of intermittent strong and weak sensation.

As one of the preferred embodiments, the wheel base is fixed on a carrier so that the wheel body can rotate in a suspension manner.

As one of the preferred embodiments, the wheel base has a first side wall away from the wheel body, the axial hole has a hole outlet on the first side wall, and a deformable and movable metal elastic stopper plate is provided on the first side wall, one end of the metal elastic stopper plate is fixed to the wheel base, and the other end can cover or leave the hole outlet after moving, and the rotating shaft can extend out of the hole outlet and push open the metal elastic stopper plate after moving.

As one of the preferred embodiments, the first position is the farthest position of the wheel body axially from the wheel base, and the metal elastic stopper completely covers the hole outlet when at the first position.

As one of the preferred embodiments, the axial hole includes a first hole section, a second hole section, and the hole outlet that are connected to each other, the second hole section has a diameter larger than the first hole section and the hole outlet, and the plurality of bearings are respectively located in the first hole section and the second hole section; a stopper block is fixed to the shaft wall of the rotating shaft, and the diameter of the stopper block is between the diameter of the first hole section and the diameter of the second hole section, and the stopper is restricted to move only within the second hole section to limit the axial movement distance of the rotating shaft.

As one of the preferred embodiments, a magnet is embedded in the first side wall, and the magnet is arranged near the hole outlet; when the magnet attracts the metal elastic stopper plate with magnetic force, the metal elastic stopper plate completely covers the hole outlet and temporarily blocks the rotating shaft from extending out of the hole outlet.

As one of the preferred embodiments, the position of the annular wavy surface corresponds to the elastic top member, and the elastic top member is connected to the second side wall by an arc-shaped cantilever extending thereon; the elasticity of the arc-shaped cantilever to be be bent and deformed is utilized to maintain the tightness of the elastic top member and the annular wavy surface in a contact state without affecting the rotation of the wheel body.

As one of the preferred embodiments, the wheel body is provided with a magnetic conductive member on the inner wall facing the wheel base, the second side wall is provided with a magnetic member, the magnetic force of the magnetic member on the magnetic conductive member keeps the wheel body at the second position, and the magnetic member faces the magnetic conductive member in a non-contact state.

As one of the preferred embodiments, the magnetic member is disposed symmetrically to the center of the rotation shaft and is a single-pole magnet, with the position and the magnetic pole facing the magnetic conductive member.

As one of the preferred embodiments, the wheel body is formed by a first shell and a second shell, joined together and partially enclosing the wheel base, and the magnetic conductive member is arranged on the inner wall of the first shell.

Compared with the prior art, the mouse scroll wheel mechanism of the present invention adopts a different switching method. The operator usually controls the mouse by touching the wheel body to rotate. When switching, the operator pushes the wheel body with a finger to move axially. As such, the mouse can be quickly switched to the toggle mode or the flywheel mode, allowing the user to operate the mouse more easily and faster.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
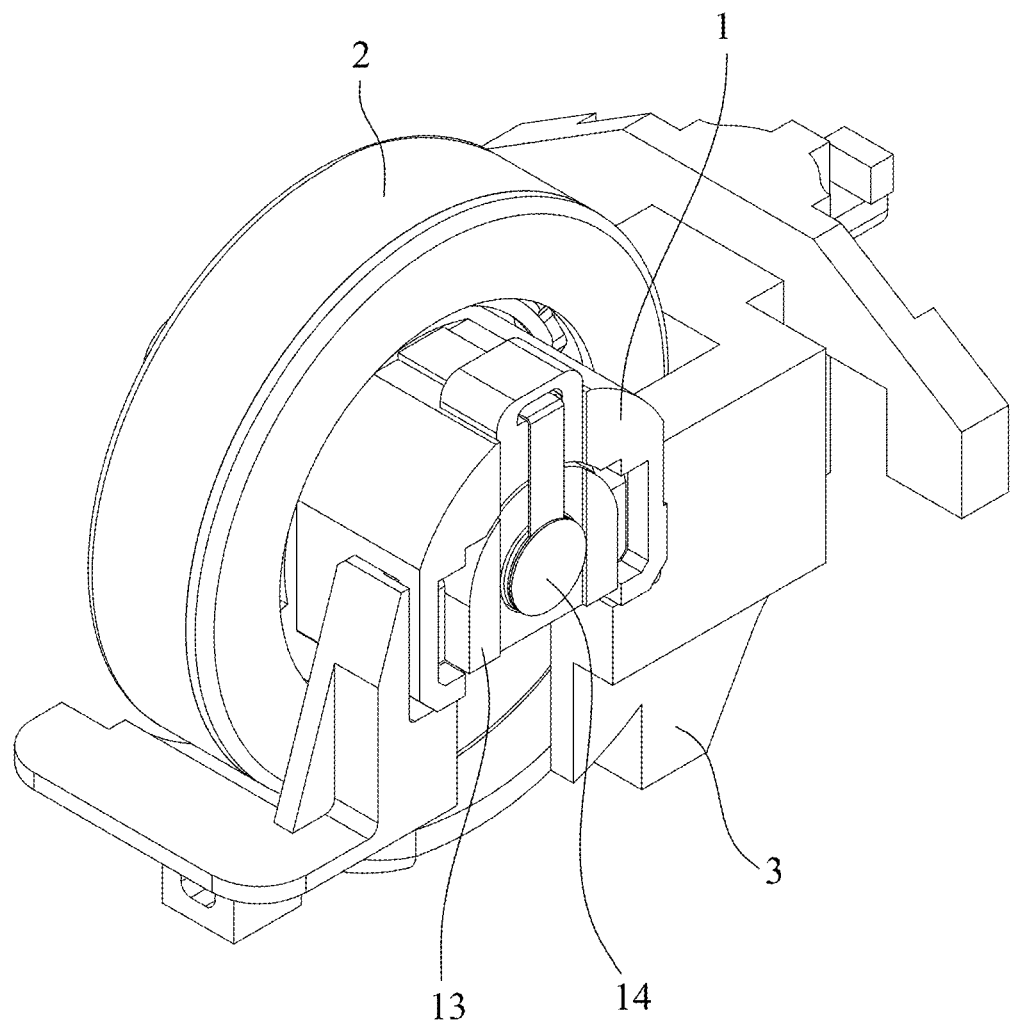
FIG. 1 is a perspective view of the present invention.
Figure 2:
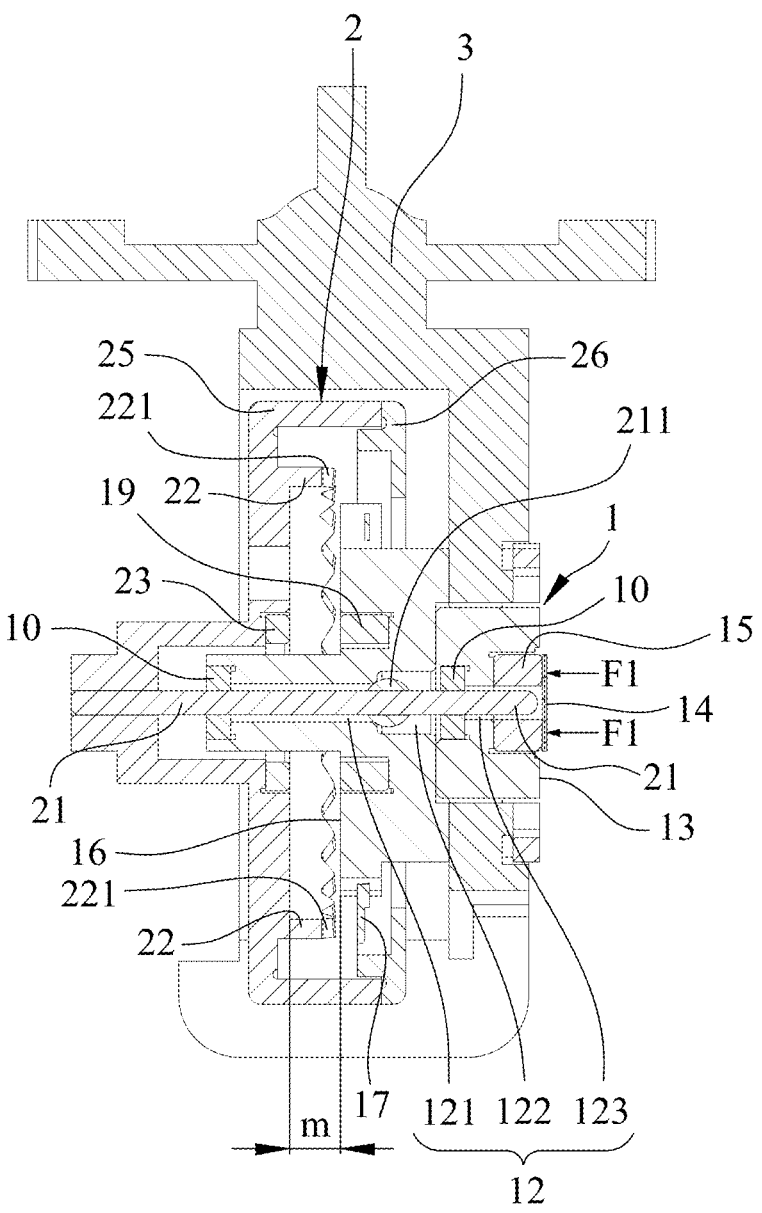
FIG. 2 is a cross-sectional view of the wheel body of the present invention moving to the first position.
Figure 3:
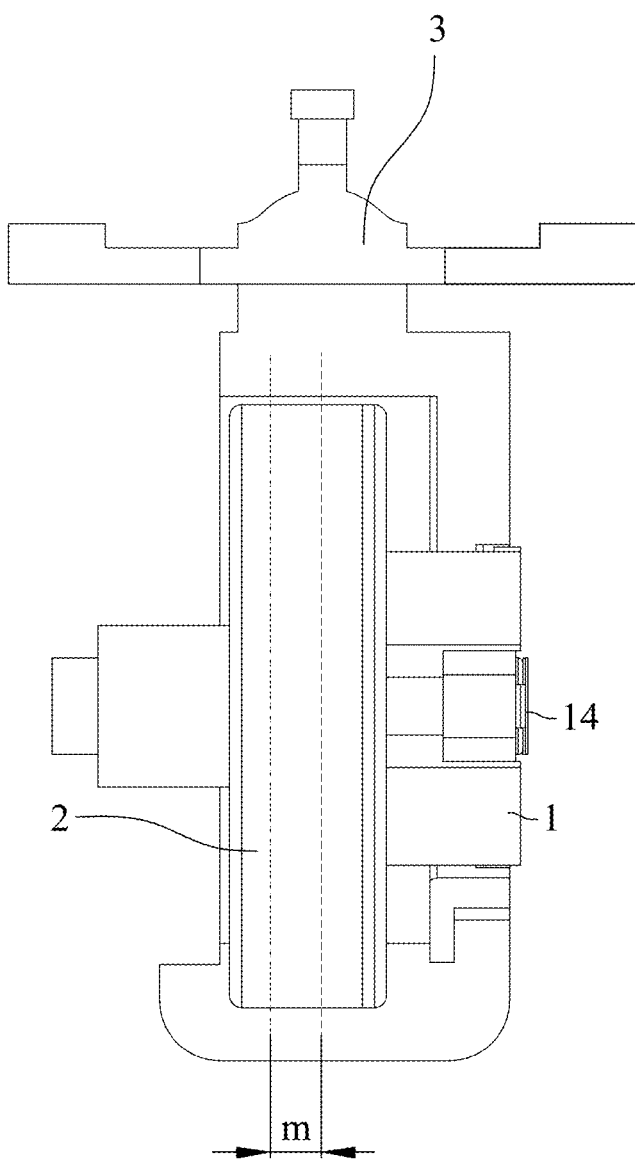
FIG. 3 is a top view of the wheel body of the present invention moving to the first position.
Figure 4:
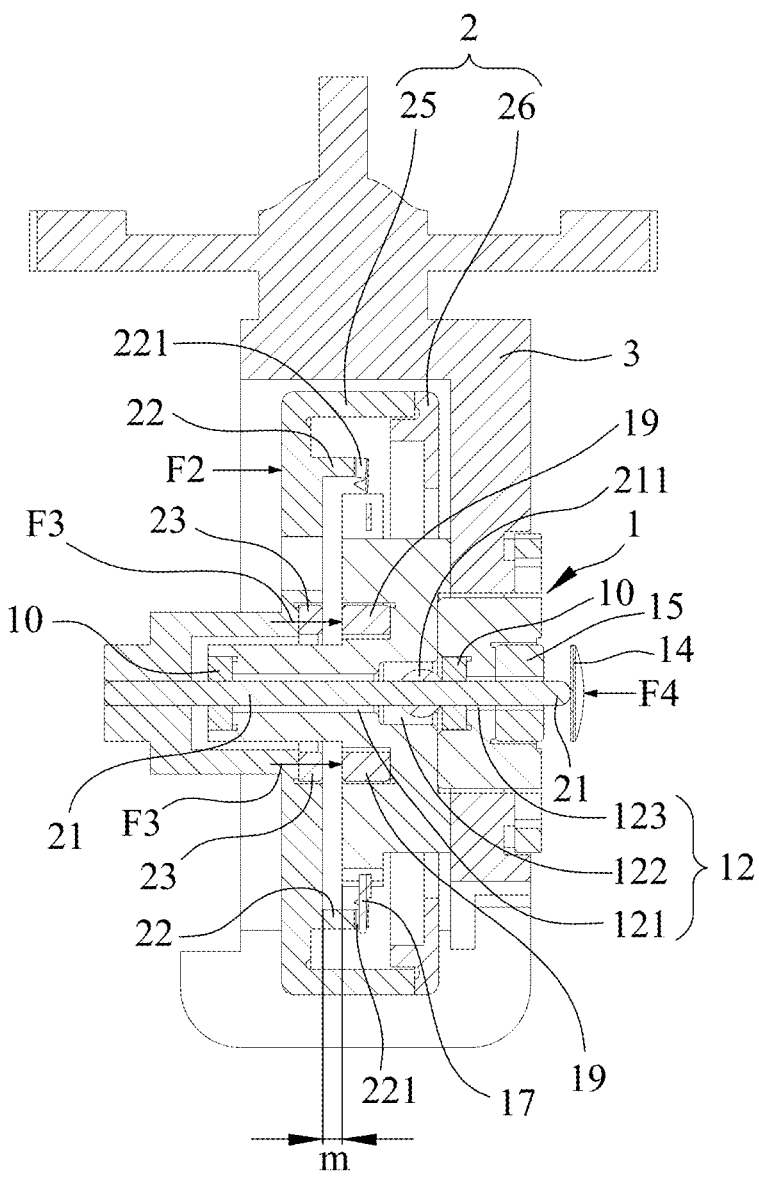
FIG. 4 is a cross-sectional view of the wheel body of the present invention moving to the second position.
Figure 5:
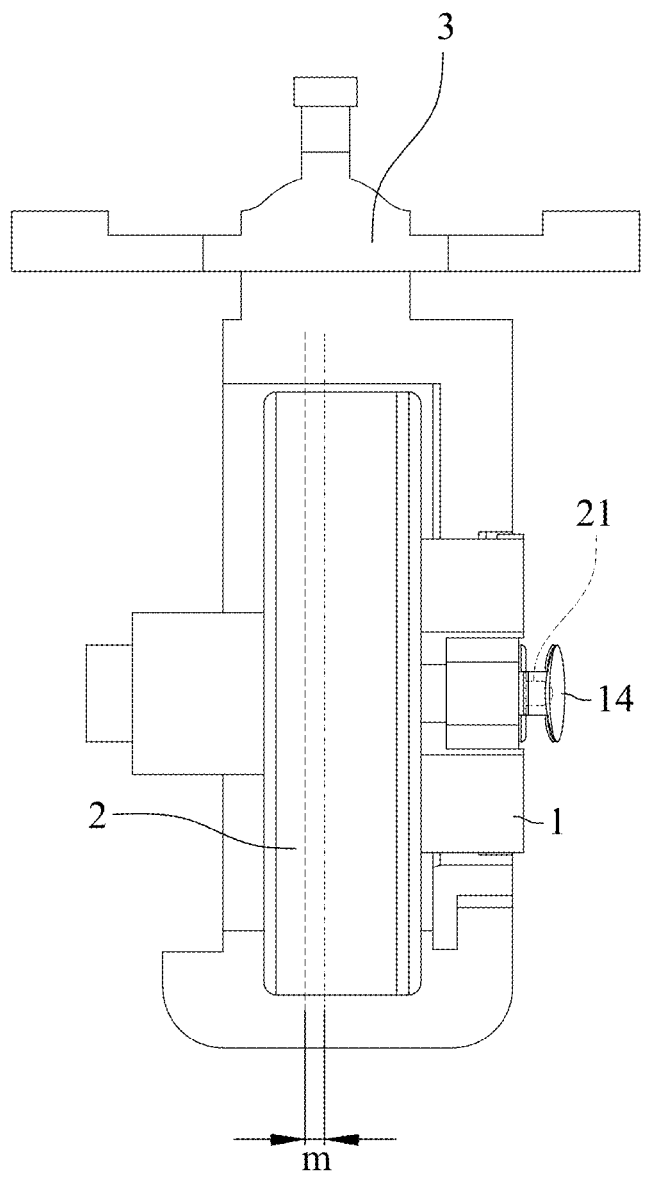
FIG. 5 is a top view of the wheel body of the present invention moving to the second position.

As shown in FIG. 1 and FIG. 2, a perspective view and a cross-sectional view of the mouse scroll wheel mechanism of the present invention are shown. The mouse scroll wheel mechanism of the present invention includes a wheel base 1 and a wheel body 2. The wheel base 1 is provided with a plurality of bearings 10 on the same center line. A rotating shaft 21 is provided extending outward from the center of the wheel body 2. The rotating shaft 21 is disposed in a plurality of the bearings 10 so that the wheel body 2 can rotate at the outside of the wheel base 1. In the present embodiment, the wheel body 2 is distributed in a ring shape outside a local area of the wheel base 1 and does not hinder the rotation of the wheel body 2. In addition, the rotating shaft 21 can also move in the bearing 10 in the axial direction for a short distance, so that the wheel body 2 can move to a first position and a second position. The wheel body 2 is provided with an annular member 22 on an inner wall facing the wheel base 1, and an end face of the annular member 22 protruding outward is an annular wavy surface 221; the wheel base 1 has a second side wall 16 facing the wheel body 2, and a movable elastic top member 17 is provided on the second side wall 16. As shown in FIGS. 2 and 3, the first position is the farthest position of the wheel body 2 axially from the wheel base 1, and the axial spacing m between the inner wall of the wheel body 2 and the wheel base 1 is at the maximum value. In this state, the elastic top member 17 is not in contact with the annular wavy surface 221. When the operator touches the wheel body 2, the wheel body 2 can rotate freely, such as rotating a large angle or rotating multiple circles at a time, which is defined as the flywheel mode. As shown in FIG. 4 and FIG. 5, the second position is the closest position of the wheel body 2 axially from the wheel base 1, and the axial spacing m between the second side wall 16 of the wheel body 2 and the wheel base 1 is at the minimum value. At this point, the elastic top member 17 is in contact with the annular wavy surface 221. When the operator touches the wheel body 2, because the elastic top member 17 moves along the annular wavy surface 221 in a back-and-forth manner repetitively, the operator can experience a gear feel of intermittent strong and weak sensation, which is defined as toggle mode. The present invention achieves mode switching by axial movement of the wheel body 2.

Figure 6:
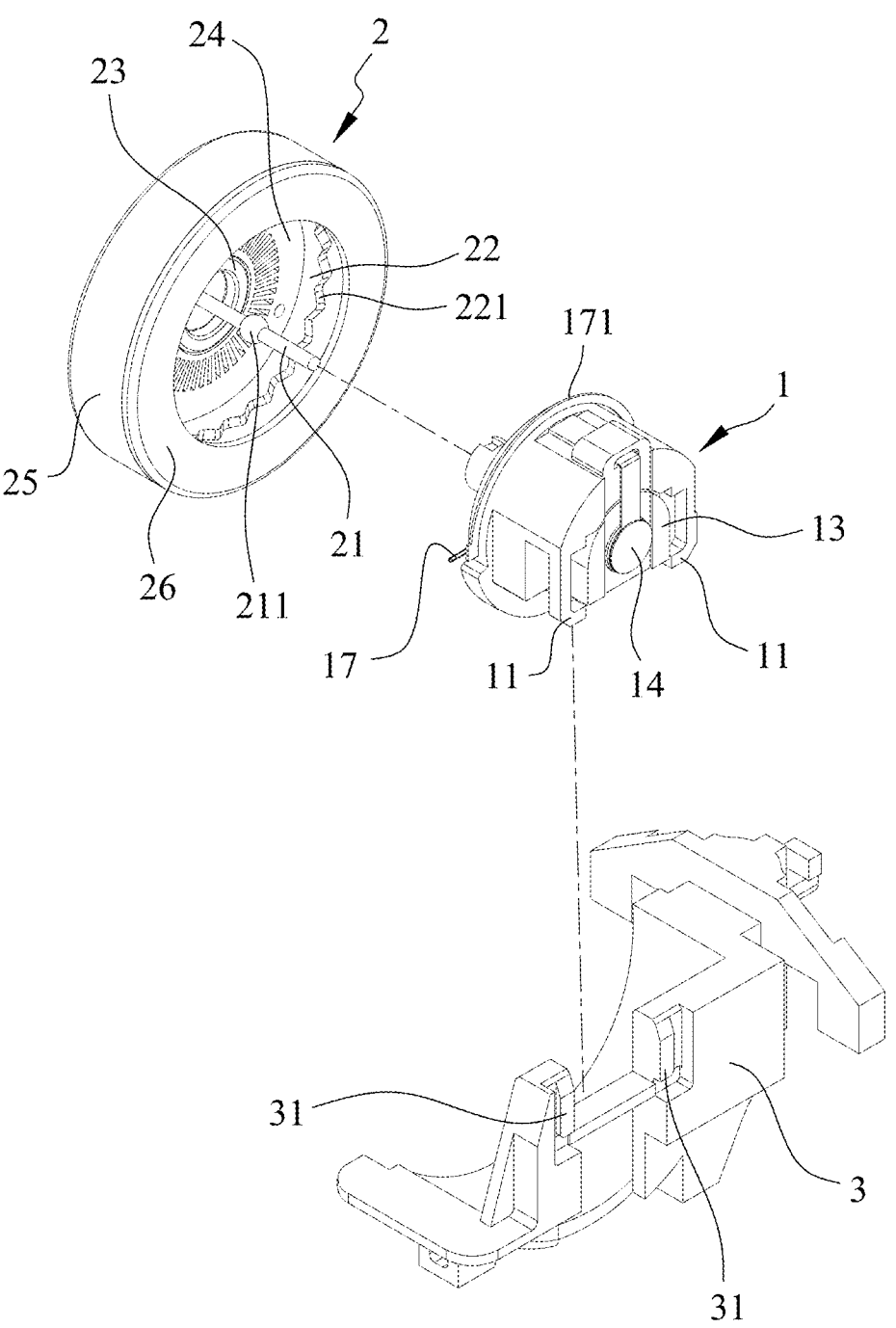
FIG. 6 is a disassembled view of certain components of the present invention.
Figure 7:
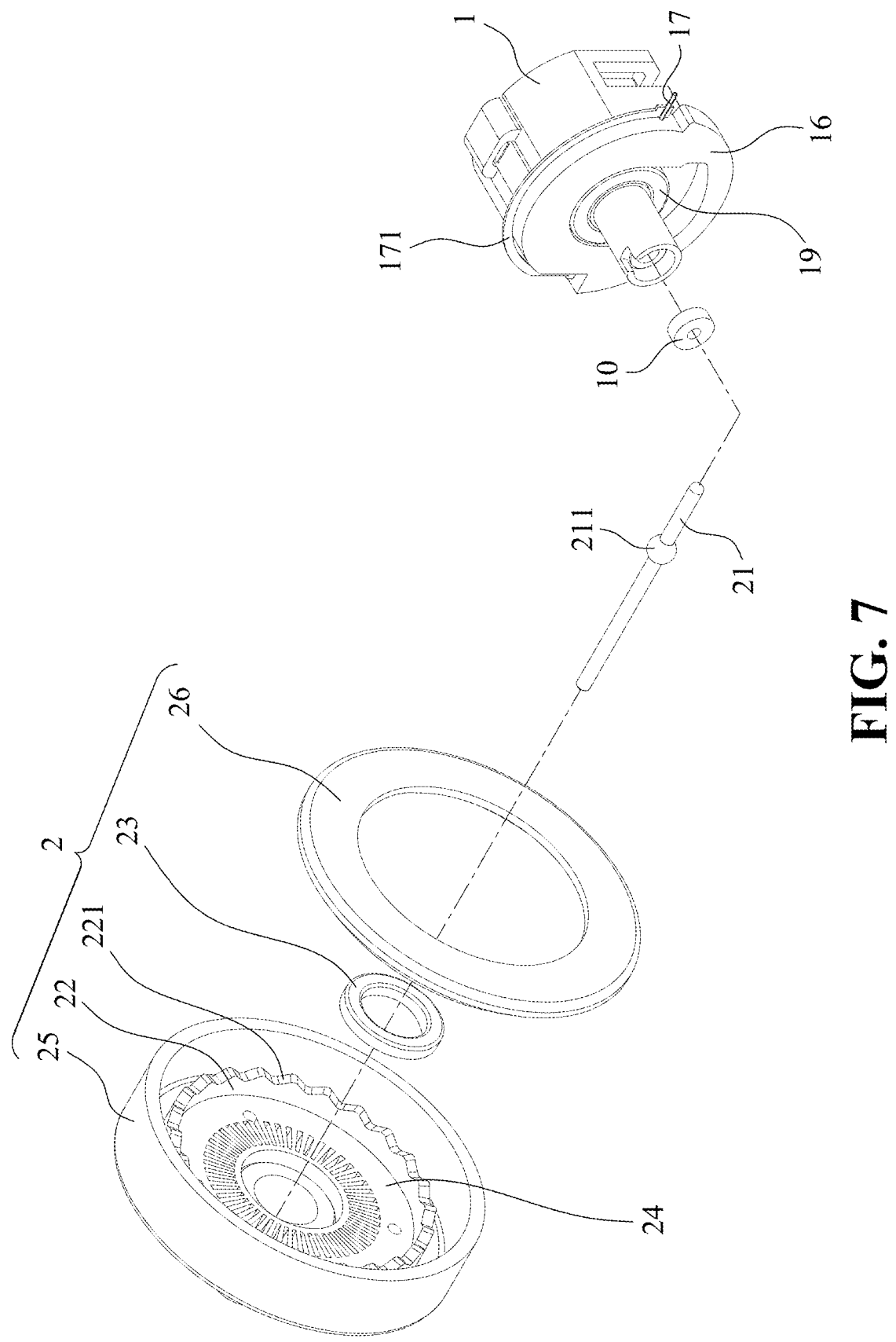
FIG. 7 is a disassembled view of the wheel body and the wheel base of the present invention.

Next, the structure of each component is described in detail:

As shown in FIGS. 1 and 6, the wheel base 1 of the present invention can be fixed on a carrier 3, so that the wheel body 2 can be suspended in mid-air and rotated when touched. The carrier 3 is a bearing structure installed and fixed inside the mouse. This structure can be of various types as needed and is not limited to the shape shown in the figure. In addition, for the convenience of assembly, in the present embodiment, the outer wall of the carrier 3 has a plurality of positioning protrusions 31 at the direction corresponding to the wheel base 1, and the wheel base 1 has a plurality of buckles 11 at the corresponding position. When the wheel base 1 is placed on the carrier 3, the buckles 11 will be fastened to the positioning protrusions 31, thereby quickly fixing the wheel base 1 and the carrier 3 together.

Referring to FIGS. 2 and 3, how the wheel body 2 rotates freely when moving to the first position is described. The wheel base 1 is provided with an axial hole 12, which runs through the wheel base 1 transversely. A plurality of the bearings 10 are arranged at different positions of the axial hole 12, thereby limiting the axial movement distance of the rotating shaft 21. In the present embodiment, the axial hole 12 at least includes a first hole section 121, a second hole section 122, and a hole outlet 123 connected to each other in sequence. The second hole section 122 has a diameter larger than that of the first hole section 121 and the hole outlet 123. A plurality of the bearings 10 are respectively located in the first hole section 121 and the second hole section 122. In addition, a stopper block 211 is provided on the shaft wall of the rotating shaft 21. In the present embodiment, the stopper block 211 is spherical in appearance. The diameter of the first hole section 121 is between the diameter of the first hole section 121 and the diameter of the second hole section 122, so that the stopper block 211 is limited to move only in the second hole section 122, thereby limiting the axial movement distance of the rotating shaft 21. In FIG. 2, the stopper block 211 moves to the leftmost position in the second hole section 122, which is the first position of the wheel body 2, and the stopper block 211 moves to the rightmost position in the second hole section 122 and in contact with the bearings 10, which is the second position of the wheel body 2.

Moreover, in order to form the axial hole 12 with multiple diameters on the wheel base 1, the wheel base 1 in the present embodiment is assembled from at least two components. The wheel base 1 has a first side wall 13 in the direction away from the wheel body 2, and the hole outlet 123 is connected to the first side wall 13. Furthermore, a metal elastic stopper plate 14 that can be partially deformed and moved is provided on the first side wall 13. One end of the metal elastic stopper plate 14 is fixed to the wheel base 1, and the other end can cover or leave the hole outlet 123 after moving. In the flywheel mode of the first position, the metal elastic stopper plate 14 completely covers the hole outlet 123, so that the stopper block 211 is close to the first hole section 121, so that the wheel body 2 can be moved to rotate freely. As shown in FIG. 4, in the toggle mode of the second position, the rotating shaft 21 can extend out of the hole outlet 123 and push open the metal elastic stopper plate 14 after moving.

In order to increase the blocking force of the metal elastic stopper plate 14 when covering the hole outlet 123, a magnet 15 is embedded in the first side wall 13. The magnet 15 is set near the hole outlet 123. In the present embodiment, the magnet 15 is annular, and the hole outlet 123 is also located in the hollow area in the center of the magnet 15. Thus, when the magnet 15 magnetically attracts the metal elastic stopper plate 14, the metal elastic stopper plate 14 can completely cover the hole outlet 123 and temporarily block the rotating shaft 21 from extending out of the hole outlet 123, which is conducive to the operation of the flywheel mode.

Next, the structure and operation of the toggle mode are described, as shown in FIGS. 4, 5, 6, and 7:

The annular member 22 is located at the inner wall of the wheel body 2 facing the wheel base 1. The annular member 22 protrudes axially from the inner wall and the protruding end face is the annular wavy surface 221. The position of the annular wavy surface 221 must correspond to the elastic top member 17. The elastic top member 17 is a component that can move slightly and automatically reset due to its own elasticity. In the present embodiment, the elastic top member 17 connected to one end of the second side wall 16 through an arc-shaped cantilever 171 extending from itself. The specific position is on the circumferential outer wall of the second side wall 16. The elasticity of the arc-shaped cantilever 171 that can bend and deform is used to maintain the tightness of the elastic top member 17 and the annular wavy surface 221 in a contact state, thereby not affecting the rotation of the wheel body 2 and producing an intermittent strong and weak gear feeling during rotation.

The wheel body 2 is provided with a magnetic conductive member 23 on the inner wall facing the wheel base 1. In the present embodiment, the magnetic conductive member 23 is an annular metal sheet. A magnet member 19 is embedded in the second side wall 16. The magnet member 19 is symmetrically arranged with respect to the center of the rotating shaft 21 and is a single-pole magnet. Its position and polar magnetism are facing the magnetic conductive member 23. The magnetic force generated by the magnet member 19 on the magnetic conductive member 23 is used to maintain the wheel body 2 in the second position. The magnet member 19 faces the magnetic conductive member 23 in a non-contact state so as not to hinder the rotation of the wheel body 2.

When the wheel body 2 is in the second position, as shown in FIGS. 4 and 6, the magnet member 19 faces the magnetic conductive member 23 in a non-contact state. The magnetic force generated by the magnet member 19 on the magnetic conductive member 23 maintains the wheel body 2 in the second position. The arc-shaped cantilever 171 maintains the tightness of the contact between the elastic top member 17 and the annular wavy surface 221. When the wheel body 2 is rotated, the elastic top member 17 reciprocates axially on the annular wavy surface 221, allowing the operator to feel the intermittent strength of the gear rotation.

Moreover, in the present embodiment, the wheel body 2 is a hollow ring-shaped structure, and a grating wheel 24 is provided to close one side of the ring-shaped structure. The grating wheel 24 cooperates with other electric control structures inside the mouse to calculate and control the angle when rotating the wheel body 2. As this is the basic structure of the mouse, the detail is not described again. In the present embodiment, the wheel body 2 is formed by a first shell 25 and a second shell 26. The magnetic conductive member 23 is arranged on the inner wall of the first shell 25, but does not cover the grating wheel 24. In addition, the rotating shaft 21 is fixed to the center position of the grating wheel 24. After assembly, although the wheel body 2 is annularly wrapped around the outside of a partial area of the wheel base 1, the rotation of the wheel body 2 is not hindered.

Next, a detailed description of the operation mode of the present invention is given:

FIG. 2 is a cross-sectional schematic view of the wheel body 2 of the present invention at the first position. When the wheel body 2 is at this position. In addition to the metal elastic stopper plate 14 shielding the hole outlet 123, the magnet 15 will generate a magnetic attraction F1 on the metal elastic stopper plate 14. Unless the operator applies a thrust greater than the magnetic attraction F1 to make the rotating shaft 21 push the metal elastic stopper plate 14, the stopper block 211 will be confined to the second hole section 122 and close to the first hole section 121. In this state, since the annular magnetic conductive member 22 is far away from the magnetic member 19 on the wheel base 1, the magnetic force of the magnetic member 19 cannot attract the magnetic conductive member 23 at all, so the wheel body 2 can be almost free from any external force. At this point, the wheel body 2 can rotate in the flywheel mode.

As shown in FIG. 4, when the operator pushes the wheel body 2 to move along the axial direction, i.e., applies a thrust F2 greater than the magnetic attraction F1 to the wheel body 2 (F2>F1), the rotating shaft 21 can push open the metal elastic stopper plate 14 and push the wheel body 2 to the second position. At this position, the magnetic conductive member 23 in the wheel body 2 is close to the magnetic member 19 of the wheel base 1. At this point, the rotating shaft 21 is subjected to two forces in different directions. The first force is the total magnetic attraction F3 of the magnetic conductive member 23 and the magnetic members 19, and the second force is the elastic restoring force F4 of the metal elastic stopper plate 14. The design of the present invention is that F3>F4, so that the stopper block 211 of the rotating shaft 21 is close to the bearing 10 in the second hole section 122, and the wheel body 2 can be stably maintained at the second position.

When the wheel body 2 is at the second position, because the elastic top member 17 is in contact with the annular wavy surface 221, the operator can feel the intermittent strength fluctuation of the gear rotation in the toggle mode.

In summary, the mouse scroll wheel mechanism of the present invention is to push the wheel body 2 to axially move to the first position or the second position, thereby switching to the flywheel mode or the toggle mode, so that the user can control the mouse more conveniently and quickly.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A mouse scroll wheel mechanism, comprising:
a wheel base, provided with an axial hole, and a plurality of bearings being provided at different positions in the axial hole; and
a wheel body, a rotating shaft extending outward being arranged at a center of the wheel body, the rotating shaft being arranged in a plurality of the bearings so that the wheel body is able to rotate on an outside of the wheel base, and the rotating shaft being able to move a short distance in an axial direction in the bearings so that the wheel body is able to move to a first position and a second position; the wheel body being provided with an annular member on an inner wall facing the wheel base, and an end face of the annular member protruding outward being an annular wavy surface; the wheel base having a second side wall facing the wheel body, and a movable elastic top member being provided on the second side wall; when the wheel body is in the first position, the elastic top member not contacting the annular wavy surface, and the wheel body being able to rotate freely when moved; when the wheel body is in the second position, the elastic top member contacting the annular wavy surface, and moving the wheel body such that the wheel body moves non-freely in the second position.

2. The mouse scroll wheel mechanism according to claim 1, wherein the wheel base is fixed on a carrier so that the wheel body can rotate in a suspension manner.

3. The mouse scroll wheel mechanism according to claim 1,
wherein the wheel base has a first side wall away from the wheel body, the axial hole has a hole outlet on the first side wall, and a deformable and movable metal elastic stopper plate is provided on the first side wall, one end of the metal elastic stopper plate is fixed to the wheel base, and the other end of the metal elastic stopper plate is arranged to cover or leave the hole outlet after moving, and the rotating shaft can extend out of the hole outlet and push open the metal elastic stopper plate after moving.

4. The mouse scroll wheel mechanism according to claim 3, wherein the first position is a farthest position of the wheel body axially from the wheel base, and the metal elastic stopper plate completely covers the hole outlet when at the first position.

5. The mouse scroll wheel mechanism according to claim 3, wherein the axial hole includes a first hole section, a second hole section, and the hole outlet that are connected to each other, the second hole section has a diameter larger than the first hole section and the hole outlet, and the plurality of bearings are respectively located in the first hole section and the second hole section; a stopper block is fixed to a shaft wall of the rotating shaft, and the diameter of the stopper block is larger than the diameter of the first hole section and smaller than the diameter of the second hole section, and the stopper block is restricted to move only within the second hole section to limit an axial movement distance of the rotating shaft.

6. The mouse scroll wheel mechanism according to claim 3, wherein a magnet is embedded in the first side wall, and the magnet is arranged near the hole outlet; when the magnet attracts the metal elastic stopper plate with magnetic force, the metal elastic stopper plate completely covers the hole outlet and temporarily blocks the rotating shaft from extending out of the hole outlet.

7. The mouse scroll wheel mechanism according to claim 1, wherein the position of the annular wavy surface corresponds to the elastic top member, and the elastic top member is connected to the second side wall by an arc-shaped cantilever extending thereon; the elasticity of the arc-shaped cantilever to be bent and deformed is utilized to maintain the tightness of the elastic top member and the annular wavy surface in a contact state without affecting the rotation of the wheel body.

8. The mouse scroll wheel mechanism according to claim 1, wherein the wheel body is provided with a magnetic conductive member on the inner wall facing the wheel base, the second side wall is provided with a magnetic member, the magnetic force of the magnetic member on the magnetic conductive member keeps the wheel body at the second position, and the magnetic member faces the magnetic conductive member in a non-contact state.

9. The mouse scroll wheel mechanism according to claim 8, wherein the magnetic member is disposed symmetrically to the center of the rotation shaft and is a single-pole magnet positioned with polar magnetism facing the magnetic conductive member.

10. The mouse scroll wheel mechanism according to claim 8 wherein the wheel body is formed by a first shell and a second shell, joined together and partially enclosing the wheel base, and the magnetic conductive member is arranged on an inner wall of the first shell.

\* \* \* \* \*